(12) United States Patent
Valio et al.

(10) Patent No.: US 8,238,411 B2
(45) Date of Patent: Aug. 7, 2012

(54) ACQUISITION OF A CODE MODULATED SIGNAL

(75) Inventors: Harri Valio, Kämmenniemi (FI); Samuli Pietilä, Tampere (FI)

(73) Assignee: Nokia Corporation, Espoo (FI)

( * ) Notice: Subject to any disclaimer, the term of this patent is extended or adjusted under 35 U.S.C. 154(b) by 875 days.

(21) Appl. No.: 11/793,574

(22) PCT Filed: Dec. 21, 2004

(86) PCT No.: PCT/IB2004/004221
§ 371 (c)(1),
(2), (4) Date: May 21, 2008

(87) PCT Pub. No.: WO2006/067538
PCT Pub. Date: Jun. 29, 2006

(65) Prior Publication Data
US 2009/0052506 A1    Feb. 26, 2009

(51) Int. Cl.
*H04B 1/00* (2006.01)
(52) U.S. Cl. ........ 375/150; 375/149; 375/343; 375/152; 375/142; 375/340; 375/147; 375/326; 375/342
(58) Field of Classification Search .................. 375/150, 375/343, 149, 152, 142, 340, 147, 326, 342; 370/310, 335, 342; 342/357.1, 357.63, 374, 342/357.73, 357.42, 357.25, 357
See application file for complete search history.

(56) References Cited

U.S. PATENT DOCUMENTS

| | | | |
|---|---|---|---|
| 6,133,874 A | 10/2000 | Krasner | |
| 7,672,404 B2 * | 3/2010 | van Diggelen et al. | ....... 375/343 |
| 2002/0005802 A1 | 1/2002 | Bryant et al. | |
| 2003/0112179 A1 | 6/2003 | Gronemeyer | |
| 2003/0214433 A1 | 11/2003 | Pietila et al. | |
| 2004/0041729 A1 | 3/2004 | Rowitch | |

* cited by examiner

*Primary Examiner* — Dhaval Patel
(74) *Attorney, Agent, or Firm* — Locke Lord LLP (57) ABSTRACT

The invention relates to the acquisition of a code modulated signal, wherein a first set of correlation results for correlations between the code modulated signal and a first replica code with different code phases and a second set of correlation results for correlations between the code modulated signal and a second replica code with different code phases are available. In order to achieve a high sensitivity, results from both sets of correlation results are combined, wherein correlation results used in the combination are selected based on information on a relative difference between a correct code phase for both replica codes. Then, it is determined based on the combination whether at least one of the sets of correlation results comprises a correlation result representing the correct code phase for the first replica code or the second replica code, respectively.

20 Claims, 5 Drawing Sheets

ACQUISITION OF A CODE MODULATED SIGNAL

CROSS REFERENCE TO RELATED APPLICATIONS

This application is the U.S. National Stage of International Application Number PCT/IB04/004221 filed on Dec. 21, 2004 which was published in English on Jun. 29, 2006 under International Publication Number WO 2006/067538.

FIELD OF THE INVENTION

The invention relates to a method for supporting an acquisition of a code modulated signal received at a receiver. The invention relates equally to a corresponding decision module, and to a mobile device, a network element and a communication system comprising such a decision module. The invention relates further to a corresponding software program product.

BACKGROUND OF THE INVENTION

A received code modulated signal has to be acquired for example in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits currently two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. More specifically, a synchronization has to be performed between the received code modulated signal and an available replica code. Usually, an initial synchronization called acquisition is followed by a fine synchronization called tracking. In both synchronization scenarios, correlators are used to find the best match between the replica code and the received signal and thus to find their relative shift called code phase. A correlator basically aligns an available replica code with the received signal using a respective code phase, multiplies the received signal sample-wise with the aligned replica code and integrates the results to obtain a correlation value for this code phase. The code phase resulting in the highest correlation value can then be assumed to be the correct code phase, if the correlation value exceeds moreover a predetermined threshold value. The match can be determined for example with chip accuracy. If an accuracy of a fraction of a chip is needed, the chip can be presented by several samples after an analog-to-digital conversion.

During the acquisition, the phase of the received signal relative to the available replica code can have any possible value due to uncertainties in the position of the satellite and the time of transmission of the received signal.

Moreover, an additional frequency modulation of the received signal may occur, which can be as large as +/−6 kHz, for example due to a Doppler effect and/or a receiver clock inaccuracy. The search of the code phase is therefore usually performed with different assumptions on an additional frequency modulation. For a sensitivity increase, in particular for weak signal environments like indoor environments, a receiver normally uses long integrations that require the frequency uncertainty to be as small as a few Hz. Therefore, even with the aligned code, a large number of frequency assumptions should be checked.

The initial acquisition is thus a two-dimensional search in code phase and frequency. Many different parallel architectures, time multiplexing and off-line processing approaches have been presented so far for the acquisition of received code modulated signals.

Figure 1:
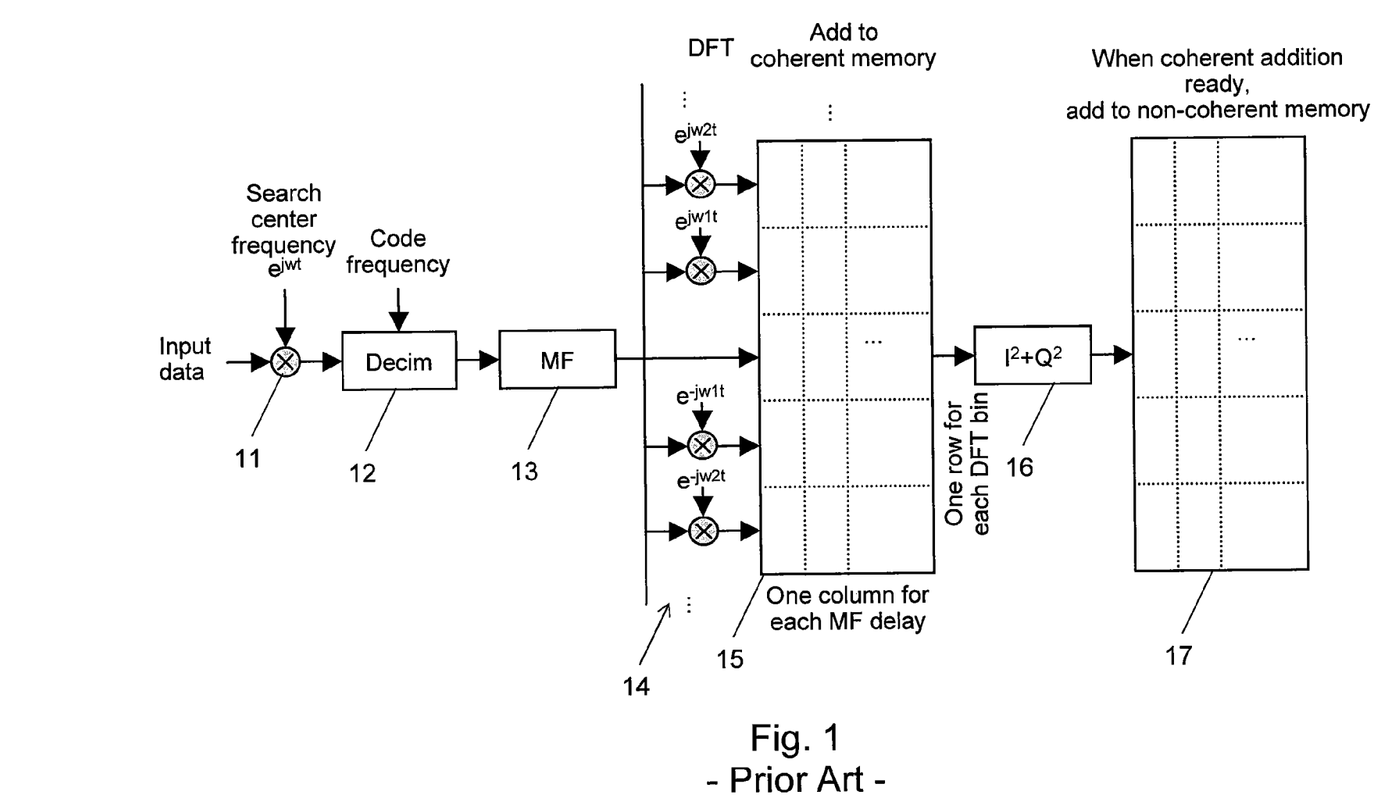
FIG. 1 is a block diagram illustrating a conventional acquisition of satellite signals.

For illustration, FIG. 1 presents a schematic block diagram of one path of an acquisition module of a conventional receiver, in which a matched filter is employed for performing correlations.

In the receiver, received samples are mixed by a mixer 11 with one of various search center frequencies $e^{j\omega t}$. The mixed samples are then decimated by a decimation block 12 in accordance with a provided code frequency. The mixed and decimated samples are provided to a matched filter 13 to find out the code phase, or delay, of the received signal compared to an available replica code. The matched filter 13 compares the received samples with an available code in parallel for various code phases between the signal samples and the available code and outputs a correlation value for each code phase. Then, it continues with new samples of the received signal.

The output of the matched filter 13 for a respective checked code phase is provided to a Discrete Fourier Transform (DFT) bank 14 to determine in addition the Doppler frequency in the received signal. The DFT bank 14 mixes to this end the respective output of the matched filter 13 in parallel with a plurality of possible Doppler frequencies $e^{j\omega_1 t}$, $e^{j\omega_2 t}$, etc., $e^{-j\omega_1 t}$, $e^{-j\omega_2 t}$, etc. The results for each possible Doppler frequency are added to a coherent memory 15 for a coherent integration of the correlation values. The coherent memory 15 is structured in the form of a table which comprises one column for each code phase checked by the matched filter 13, and one row for each DFT bin.

A processing component 16 then forms the sum over the squared I and Q components for each entry in the coherent memory 15.

A further provided non-coherent memory 17 is structured in the same way as the coherent memory 15. The output of the processing portion 16 is added to a respective field in the non-coherent memory 17 for an additional non-coherent integration. After the non-coherent integration length, it comprises final correlation values for any combination of the checked code phases and the checked Doppler frequencies.

The entries in the non-coherent memory 17 are then evaluated in a decision module (not shown). The correct code-phase and the correct frequency modulation compensation result in a larger integration value than an incorrect code-phase and/or an inappropriate frequency modulation compensation. Thus, detecting the maximum correlation value in the non-coherent memory 17 and comparing it with a certain threshold enables the decision module to find the correct code phase and the correct frequency of modulation.

Some GPS receivers may receive assistance data from some other unit, in particular from a wireless communication network. Such assistance data may include for instance a reference position, an accurate time or navigation data belonging to certain satellites, for supporting the assisted GPS receiver in acquiring satellite signals. Modern assisted GPS receivers search for up to eight satellites in parallel from full code uncertainty.

In assisted GPS receivers without an accurate time assistance, it is a particular challenge to acquire the signal of a first satellite.

If the code phase of one satellite signal is known, then code phases for other satellite signals can be predicted based on information from measurements on the first satellite signal, including code phase and Doppler frequency.

Such a prediction has been described for example in the U.S. Pat. No. 6,133,874. Here, it is assumed that a receiver has acquired a first satellite signal in a conventional manner, and that the code phase for this signal is thus known. In addition, a reference position, a reference time and the approximate position of other satellites versus time are assumed to be known. The approximate position of a satellite can be known for instance from available Almanac data for this satellite. All information may be provided for example by a mobile communications network as assistance data to the receiver.

The time of arrival of the first satellite signal has been determined to be $T_1$. The assumed time of arrival of a second satellite is $T_2$ and can then be determined relative to the time $T_1$ to be $(T_2-T_1)=(R_2-R_1)/c$, where $R_1$ is the range between the position of the first satellite and the receiver, where $R_2$ is the range between the position of the second satellite and the receiver, and where c is the speed of light. The pseudo range to a respective satellite can be determined as the difference between the respective available satellite position and the available reference location.

Since the code phase for the acquired first satellite signal is known, the code phase for the second satellite signal can be predicted to correspond to the code phase for the acquired first satellite signal plus the difference in the time of arrival of both signals $(T_2-T_1)$. The code phase for further satellite signals can be predicted in a corresponding manner.

In addition, an uncertainty range for this prediction can be determined, as will be explained in the following. The uncertainty range can then be used to determine a prediction interval in which the code phases for the other satellite signals should lie, and the prediction interval can be used as a limited search range.

The maximum Line-Of-Sight (LOS) satellite speed is about 1 km/s, while the average is approximately 0.5 km/s. The maximum Doppler change is about 1 Hz/s. An urban WCDMA network, for instance, can provide a reference position as assistance data with an accuracy of less than 3 km, while the average accuracy is about 1 km. The accuracy of a time provided as assistance data is about 3 s in most wireless communication networks.

Based on these assumptions, the average uncertainty range for the code phases for other satellite signals can be predicted. A time error of 3 s results in a code prediction error of 1.5 km due to the LOS speed. A reference position error of 1 km results in a maximum code prediction error of +/−1 km. On average, the total code phase prediction error is thus smaller than 2.5 km. This means that code phases for the remaining satellite signals can be predicted with an average error of approximately 8 µs. The Doppler prediction is anyhow accurate to a few Hz.

The limited search range for the rest of the satellite signals results in a faster acquisition of these signals and enables moreover a detection of weaker signals.

In some situations, however, all satellite signals are so weak that even the correlation values for the strongest satellite signal level lie below the predetermined detection threshold value. In this case, none of the satellites can be found.

It has to be noted that a similar problem may occur with any other receiver of code modulated signals, in particular with any receiver of another Global Navigation Satellite System (GNSS), like the European satellite navigation system Galileo or Glonass.

SUMMARY OF THE INVENTION

The invention improves the acquisition of code modulated signals.

A method for supporting an acquisition of a code modulated signal received at a receiver is proposed, wherein at least a first set of correlation results for correlations between the code modulated signal and a first replica code with different code phases and a second set of correlation results for correlations between the code modulated signal and a second replica code with different code phases are available. The proposed method comprises combining results from the first set of correlation results and from the second set of correlation results, wherein correlation results used in the combination are selected based on information on a relative difference between a correct code phase for the first replica code and a correct code phase for the second replica code. The proposed method further comprises determining based on the combination whether at least one of the first set of correlation results and the second set of correlation results comprises a correlation result representing the correct code phase for the first replica code or the second replica code, respectively.

Moreover, a decision module for supporting an acquisition of a code modulated signal received at a receiver is proposed. The decision module has access to at least a first set of correlation results for correlations between the code modulated signal and a first replica code with different code phases and a second set of correlation results for correlations between the code modulated signal and a second replica code with different code phases. The proposed decision module is adapted to combine results from the first set of correlation results and from the second set of correlation results, wherein correlation results used in the combination are selected by the decision module based on information on a relative difference between a correct code phase for the first replica code and a correct code phase for the second replica code. The proposed decision module is further adapted to determine based on the combination whether at least one of the first set of correlation results and the second set of correlation results comprises a correlation result representing the correct code phase for the first replica code or the second replica code, respectively.

Moreover, a mobile device is proposed, which comprises the proposed decision module.

Moreover, a network element for a communication network is proposed, which comprises the proposed decision module.

Moreover, a communication system is proposed, which comprises a network element of a communication network and a mobile device. The mobile device is adapted to communicate with the network element. At least one of the mobile device and the network element includes the proposed decision module.

Moreover, a software code for supporting an acquisition of a code modulated signal received at a receiver is proposed, wherein at least a first set of correlation results for correlations between the code modulated signal and a first replica code with different code phases and a second set of correlation results for correlations between the code modulated signal and a second replica code with different code phases are available. When running in a processing unit, the software code realizes the steps of the proposed method.

Finally, a software program product is proposed, in which the proposed software code is stored.

The invention proceeds from the idea that a knowledge about the relation between code phases for different code modulated signals can be exploited for acquiring these signals. The invention proceeds further from the idea that while results of correlations for a respective replica code might not be suited by themselves for detecting a correct code phase, for instance because the concerned signal is too weak, a combination of the correlation results for several replica codes might be suited to provide an indication of the code phases, if the known relation between the code phases is taken into account when combining the correlation results.

It is an advantage of the invention that it reduces the search time and/or increases the sensitivity of a signal acquisition. It is in particular an advantage of the invention that it allows finding a correct, code phase for a first replica code, even in case none of the correlation values exceeds a predetermined threshold value.

It is further an advantage that it may be realized in some applications by a pure software change. In many assisted receivers, for example, all required information is already available.

In one embodiment of the invention, the correlation results are correlation values, and the correlation values of each of the sets of correlation results represent a respective correlation between samples of the received signal and one of a plurality of available replica codes with a plurality of code phases between the samples of the received signal and the available replica code. The combination may then comprise:
a) selecting a highest one of the correlation values at least in a subset of the available correlation values, the selected correlation value being associated to a first replica code and a first code phase;
b) determining a respective prediction interval for a correct code phase for other replica codes than the first replica code based on the first code phase; and
c) combining the selected correlation value with correlation values from the prediction intervals.

The determination may then comprise accepting the first code phase as a correct code phase for the first replica code, if a result of the combination exceeds a predetermined threshold value.

This embodiment is based on the consideration that prediction intervals for code phases could be used already for finding the correct code phase for a first replica code. It is proposed that such prediction intervals are determined for various replica codes based on a code phase which is associated to a highest correlation value, even if this highest correlation value does not exceed a conventionally monitored threshold value. If the highest correlation value is associated to the correct code phase for a certain replica code, it can be assumed that prediction intervals which are determined based on this code phase will include a significant correlation peak as well. The highest correlation value can thus be assumed to be associated to the correct code phase for a certain replica code, if a suitably selected threshold value is exceeded by a combination of the highest correlation value with correlation values in the prediction intervals.

In some assisted receivers, a prediction of intervals is already implemented. In the proposed embodiment of the invention, the prediction calculations are then just carried out at an earlier phase than in a conventional approach.

In a further embodiment of the invention, the proposed processing of correlation values is only carried out, in case none of the correlation values exceeds a further predetermined threshold value, that is, in those cases in which a conventional search would have to be terminated. As in a conventional acquisition, this further predetermined threshold value is set such that a correlation value exceeding this further predetermined threshold value can be assumed positively to be associated to the correct code phase of the associated replica code. Prediction intervals can then be used in a conventional manner for finding the correct code phases for other replica codes.

In a further embodiment of the invention, the available correlation values are determined for a plurality of frequency compensations for each combination of a particular replica code and a particular code phase.

In this case, the selected correlation value will be associated not only to a particular replica code and a particular code phase, but equally to a particular frequency compensation, which will be referred to as a first frequency compensation. If the selected correlation value is associated to the correct code phase and the correct frequency compensation for the first replica code, it can be assumed that the same frequency compensation will be required for the other replica codes. In one embodiment of the invention, a prediction interval for a respective correct code phase for other replica codes than the first replica code is therefore determined only for correlation values resulting with this first frequency compensation.

The selected correlation value can be combined in various ways with correlation values in the prediction intervals. In one possible approach, the selected correlation value is combined with a respective highest correlation value from each prediction interval. In another possible approach, the selected correlation value is combined with all correlation values in all prediction intervals.

In case a result of the combination does not exceed the predetermined threshold value, it can be assumed that the selected highest correlation value is not associated to the correct code phase and/or possibly the correct frequency compensation for the first replica code.

In one embodiment of the invention, thereupon a next highest one of the correlation values at least in the subset of the available correlation values is selected. The newly selected correlation value is associated to a new first replica code, a new first code phase and possibly a new frequency compensation. The evaluation is then continued with the prediction of intervals for the respective other replica codes.

This process can be continued in a loop until the correct code phase for a first replica code is found. Advantageously, the process is limited, however, to a predetermined number of iterations; as with decreasing correlation peaks, the probability to find the correct one decreases as well. At some point it can be assumed to be more efficient to start anew with another set of correlation values.

The determination of the correlation values itself, which is well known in the art, forms part of one embodiment of the invention. It can be carried out in parallel and/or sequentially. In a sequential search, the correlation values have to be saved and an accurate timing has to be ensured between the searches. A parallel search may comprise for example for each replica code a matched filter operation, a DFT operation, a coherent integration and a non-coherent integration.

Each of the replica codes may be associated in particular to a respective transmitting unit which employs a corresponding code for encoding signals for transmission. Such a transmitting unit can be for example a satellite of a satellite based navigation system, like GPS, Galileo or Glonass.

It has to be noted that the available replica codes do not have to be associated to transmitting units of a single transmission system, though.

In one embodiment of the invention, the code modulated signal received at a receiver comprises signals transmitted by a plurality of satellites of at least two different satellite navigation systems. Each replica code corresponds to a code employed by one of the satellites for encoding signals for transmission. A highest correlation value may then be selected only from a subset of correlation values which are available for replica codes associated to satellites of only one of the satellite navigation systems.

For example, a highest correlation value may be selected from those correlation values which are associated to GPS replica codes. This value can then be used for determining prediction intervals for code phases for Galileo replica codes. The selected GPS correlation value may be combined with Galileo correlation values in the prediction intervals. This is possible, if an accurate timing is kept during the determination of all correlation values. If the combining result exceeds a predetermined threshold, the prediction intervals can be assumed to be appropriate search intervals for the code phases for the Galileo replica codes. This approach minimizes the Galileo acquisition hardware while enhancing at the same time the sensitivity of the acquisition.

The invention can be employed in any situation in which one or more signals modulated with a plurality of codes are received at a receiver.

The proposed mobile device can correspond for example to this receiver. The proposed mobile device can be for instance, though not exclusively, a receiver for a satellite based navigation system, or a mobile terminal of a wireless communication system comprising such a receiver.

The proposed mobile device may comprise in addition to the proposed decision module a receiver which is adapted to receive a code modulated signal and an acquisition module adapted to determine correlation values representing a respective correlation between samples of a received signal and a plurality of available replica codes with a respective plurality of code phases between the samples of the received signal and each of the available replica codes.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 2:
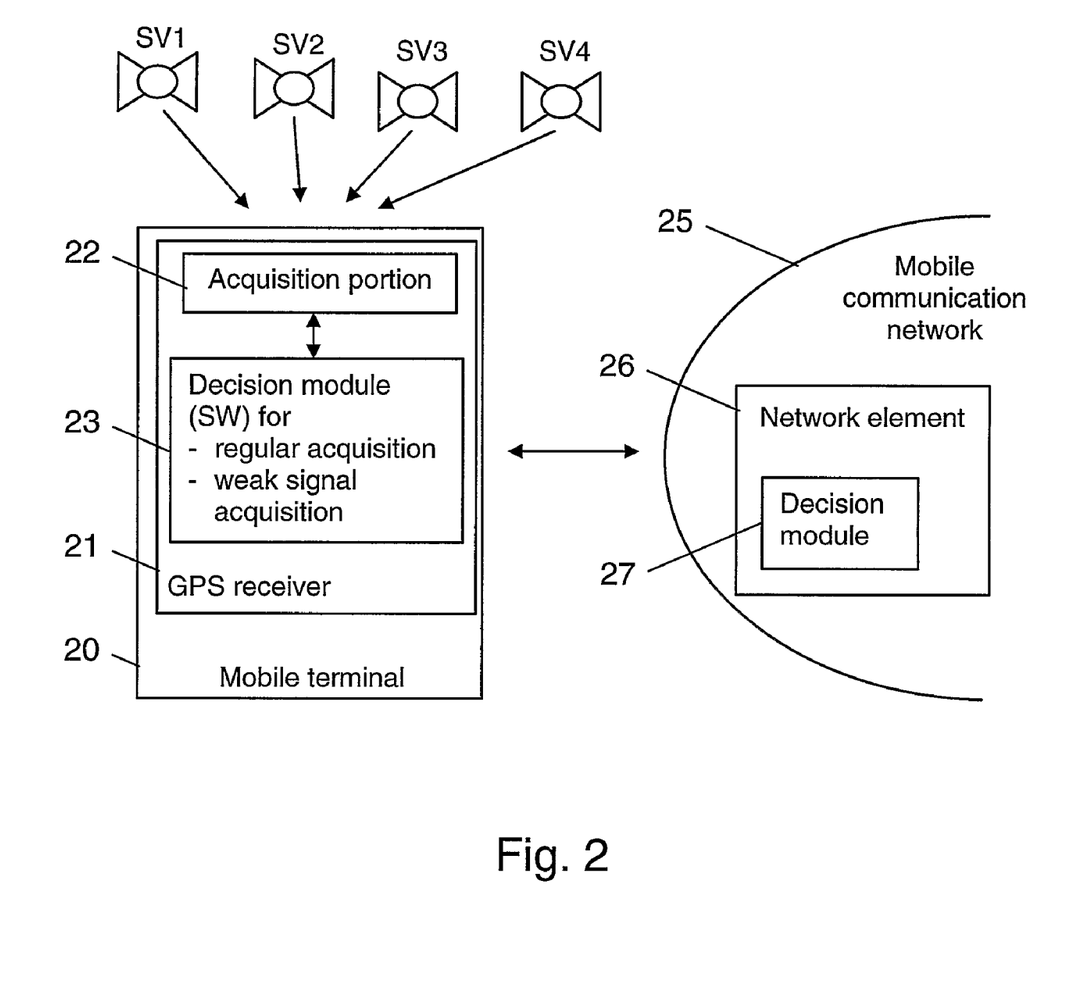
FIG. 2 is a schematic diagram of a system according to an embodiment of the invention.

FIG. 2 is a schematic diagram of a system in which a first satellite signal can be acquired in accordance with an embodiment of the invention.

The system comprises a mobile terminal 20, a network element 26 of a mobile communication network 25 and a plurality of GPS satellites, which are also referred to as 'space vehicles', SV1, SV2, SV3, SV4.

Each of the GPS satellites SV1 to SV4 transmits a signal modulated with a C/A code and navigation information as described above.

The mobile terminal 20 comprises in addition to conventional components required for of a mobile communication via the mobile communication network 25 a GPS receiver 21. The GPS receiver 21 includes as part of conventional components an acquisition module 22 and a decision module 23. The acquisition module 22 may be a conventional acquisition module 22, which comprises four correlation paths as presented in FIG. 1, each for another replica code. The decision module 23, however, is supplemented in accordance with the invention. It assumed by way of example that the decision module 23 is realized by a software code (SW) running in a processing unit of the mobile terminal 20, even though it may equally be implemented in hardware. The implementation of the software will be explained further below with reference to FIG. 3.

The network element 26 of the communication network 25 is able to provide GPS assistance data to the GPS receiver 21 by means of a regular mobile communication with the mobile terminal 20. The assistance data can comprise, for instance, the position of the network element 26 as a reference position and navigation data extracted from GPS signals received in the communication network 25. In addition, the network element 26 might comprise a decision module 27. This decision module 27 corresponds to the decision module 23.

Figure 3:
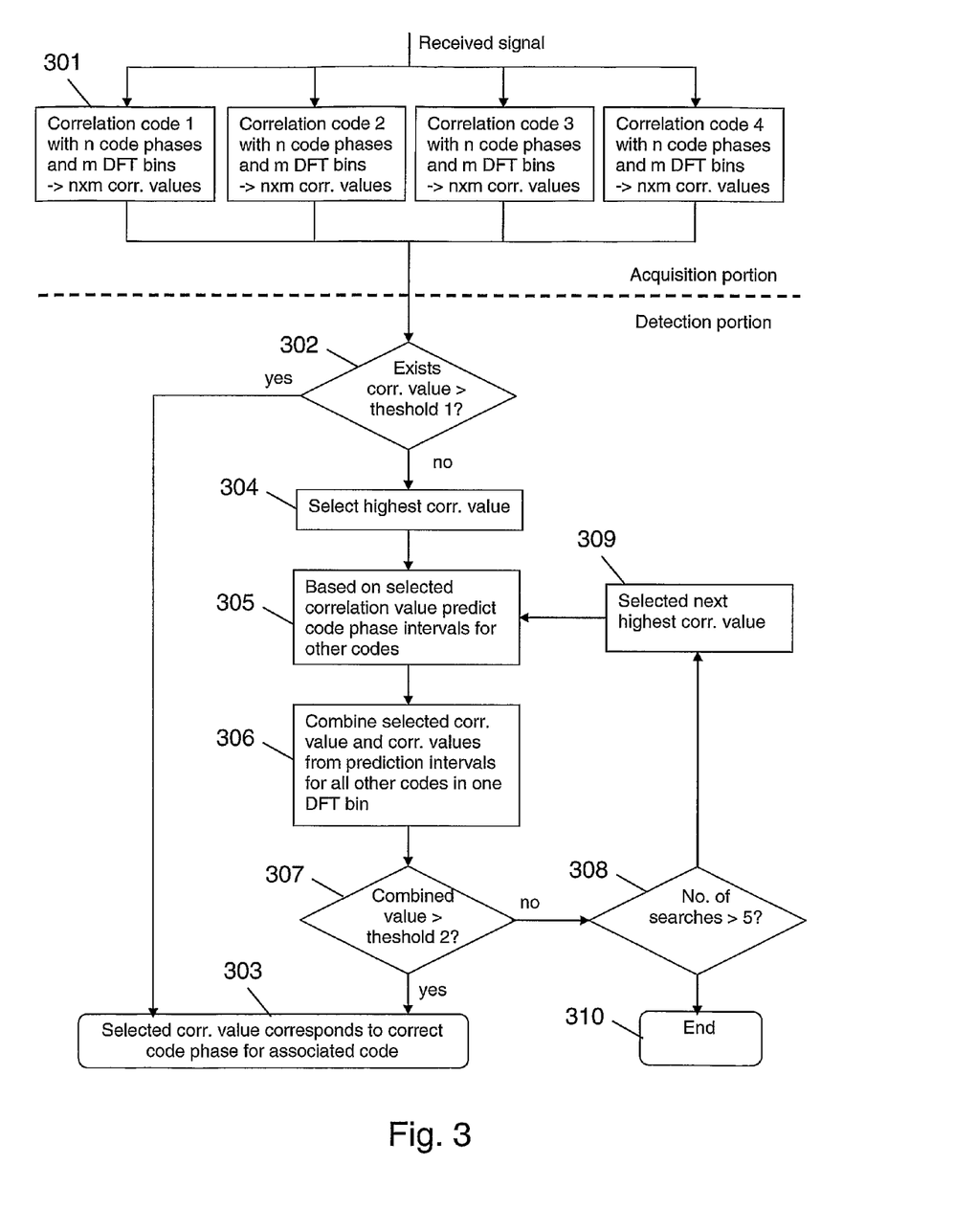
FIG. 3 is a flow chart illustrating the acquisition of a first satellite signal in the system of FIG. 2 according to an embodiment of the invention.

FIG. 3 is a flow chart illustrating the acquisition of a first satellite signal by the GPS receiver 21. At the top, the operation in the acquisition module 22 is indicated, while further below and separated by a dashed line, the operation in the detection module 23 is shown.

In the acquisition module 22, samples of a received signal are processed in parallel for four different replica codes, as described with reference to FIG. 1 for one replica code. Each replica code is associated to another one of the four satellites SV1 to SV4.

The matched filter operation with n code phases and the subsequent frequency correction with m DFT bins results for each replica code in n×m correlation values which are stored in a respective non-coherent memory 17 (step 301).

Figure 4:
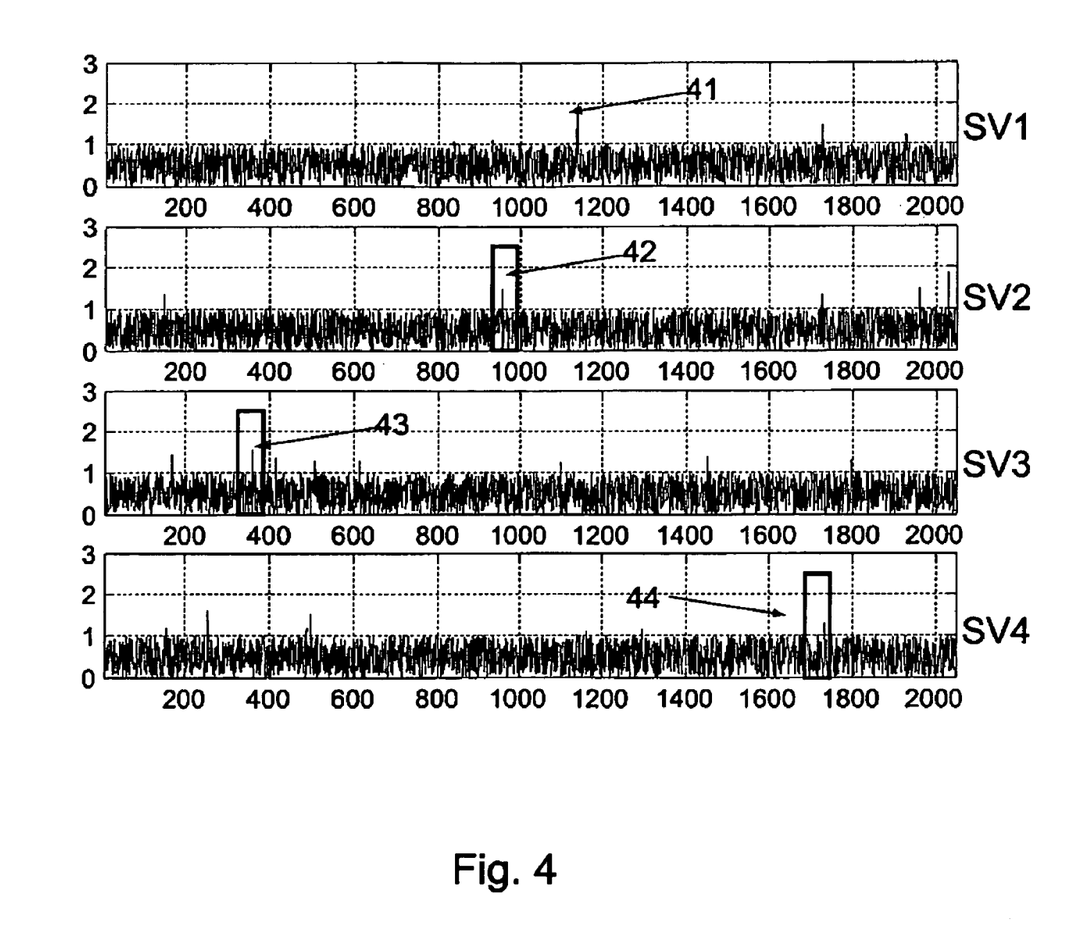
FIG. 4 presents diagrams showing exemplary correlation values.
Figure 5:
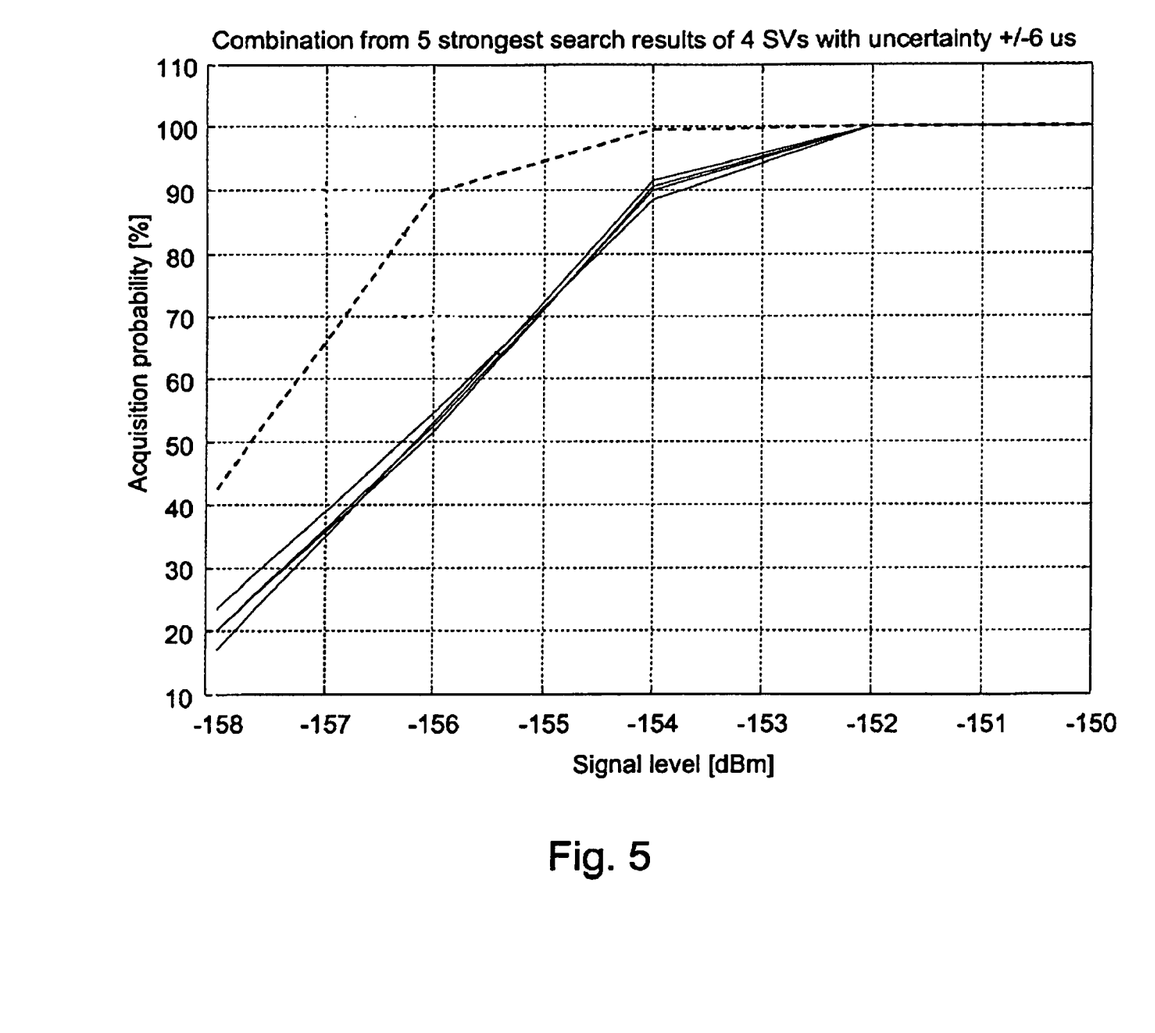
FIG. 5 is a diagram presenting simulation results.

FIG. 4 presents for each satellite SV1 to SV4 a diagram with an exemplary sequence of n=2046 correlation values for one DFT bin. Corresponding correlation values exist for all other considered DFT bins.

In the decision module 23, the correlation values are retrieved from the non-coherent memories 17 of the acquisition module 22 and compared to a first threshold value (step 302).

If one of the correlation values is detected to exceed the first threshold value, this correlation value is assumed to represent a correct replica code at a correct code phase for the received signal. (step 303) If only a correlation value for one of the checked replica code exceeds the threshold value, knowledge about this replica code can be made use of for acquiring further satellite signals in a conventional manner.

If none of the correlation values exceeds the first threshold value, the highest correlation value which is provided by the acquisition module 22 is selected (step 304).

In the example of FIG. 4, the first threshold value is assumed to be 2.5. It can be seen that none of the depicted correlation values exceeds this threshold value. It is further assumed that none of the correlation values for the other DFT bins exceeds the first threshold value. The highest correlation value 41 among all correlation values has a value of approximately 2 and belongs to the first satellite SV1. This correlation value is thus selected.

Based on the selected correlation value, which has been obtained with a replica code associated to a certain satellite, a code phase prediction is performed for the other three replica codes sequences. The code phase prediction as such is well known and can be realized for example as described above with reference to the document U.S. Pat. No. 6,133,874. It results in a predicted code phase for each of the other replica codes. When a respective predicted code phase is combined with an uncertainty value, a prediction interval is obtained for the associated replica code, which can be assumed to cover the correct code phase. (step 305)

Since the Doppler prediction has an accuracy of a few Hz, the correct search results for all satellites S1 to S4 can be assumed to be located in the same DFT bin. Therefore, only the DFT bin in which the selected correlation value has been found is considered when determining a prediction interval for the remaining satellites.

In the example of FIG. 4, resulting prediction intervals for each of the satellites SV2 to SV4 are indicated by a respective rectangle 42 to 44.

The correlation values in the prediction intervals are then combined with the selected correlation value (step 306), for example in accordance with the following relation:

Combined value = selected correlation value +
$$\max(\text{prediction code phase for } SV2 \pm \text{uncertainty}) +$$
$$\max(\text{prediction code phase for } SV3 \pm \text{uncertainty}) +$$
$$\max(\text{prediction code phase for } SV4 \pm \text{uncertainty})$$

For the example of FIG. 4, this means more specifically that in each of the prediction intervals 42 to 44, the maximum correlation value is determined. Even though not pointed out separately, in each of the prediction intervals 42 to 44 a clear maximum correlation value can be seen. The selected correlation value 41 and the maximum correlation values determined for each of the prediction intervals 42 to 44 are then summed.

It is to be understood that presented method of combining the search results constitutes only an example. It will be readily apparent to those skilled in this art that many other combination methods can be used as well.

The combined value is compared to a second threshold value (step 307).

If the combined value exceeds a second threshold value, the selected correlation value is assumed to correspond to a correct code phase for a certain satellite signal (step 303).

Otherwise, the next highest correlation value among all correlation values is determined (step 309), and steps 305 to 307 are repeated proceeding from this next highest correlation value as a selected correlation value.

Once a correct code phase for a first replica code has been found, the code phases for the remaining three replica codes can be searched for in a conventional manner within the respective prediction interval.

Steps 305 to 309 are repeated in a loop, until a correct code phase for a certain satellite signal has been found, or until the five highest correlation values have been evaluated, which is checked in each iteration between steps 307 and 309 as a step 308. When the five highest correlation values have been evaluated without success, it is assumed that a signal acquisition based on the current correlation values is not possible. The signal acquisition is thus terminated and started anew (step 310). It is to be understood that evaluating up to five highest correlation values is just an example; any other number can be used also.

It has to be noted that the processing performed by the decision module 23 of the GPS receiver 21 could also be taken care of at least partly by the decision module 27 of the network element 26. To this end, the GPS receiver 21 provides any required information to the network element 26, making use of a regular mobile communication link between the mobile terminal 20 and the mobile communication network 25. This approach is of advantage for enabling GPS receivers 21 to make use of the invention, even though they are not provided with a supplemented decision module 22 themselves, and/or for saving processing power at the mobile terminal 20.

Simulations show that when trying on the one hand to acquire several GPS satellite signals each by itself from full code uncertainty and on the other hand to acquire all GPS satellite signals with the presented approach from full code uncertainty, the same acquisition probability of e.g. 90% can be achieved with a significantly lower signal level compared to individual searches.

New receivers are able to search up to eight satellites in parallel. Using eight satellites in the evaluation would further improve the results. Doubling the number of satellites which are used for a peak check from four to eight results in an optimum case in a gain which is increased by 3 dB. This is due to the fact that even in a parallel search noise in the search results is not correlating, as the incoming signal is 'de-spread' with the replica codes. The prediction uncertainty diminishes the gain only to a limited extent.

It is to be noted that the described embodiment can be varied in many ways and that it moreover constitutes only one of a variety of possible embodiments of the invention.

What is claimed is:

1. A method for supporting an acquisition of a code modulated signal received at a receiver, wherein at least a first set of correlation results for correlations between said code modulated signal and a first replica code with different code phases and a second set of correlation results for correlations between said code modulated signal and a second replica code with different code phases are available, said second replica code different from said first replica code, said method comprising:

combining results from said first set of correlation results and from said second set of correlation results, wherein correlation results used in said combination are selected based on information on a relative difference between a correct code phase for said first replica code and a correct code phase for said second replica code; and determining based on said combination whether at least one of said first set of correlation results and said second set of correlation results comprises a correlation result representing said correct code phase for said first replica code or said second replica code, respectively.

2. The method according to claim 1, wherein said correlation results are correlation values, and wherein correlation values of each of said sets of correlation results represent a respective correlation between samples of said received signal and one of a plurality of available replica codes with a plurality of code phases between said samples of said received signal and said available replica code,
wherein said combination comprises:
a) selecting a highest one of said correlation values at least in a subset of said available correlation values, said selected correlation value being associated to a first replica code and a first code phase;
b) determining a respective prediction interval for a correct code phase for other replica codes than said first replica code based on said first code phase; and
c) combining said selected correlation value with correlation values from said prediction intervals;
and wherein said result determination comprises in case a result of said combination exceeds a predetermined threshold value, accepting said first code phase as a correct code phase for said first replica code.

3. The method according to claim 2, further comprising a preceding step of determining whether any of said correlation values exceeds a further predetermined threshold value and proceeding with said selecting only in case none of said correlation values exceeds said further predetermined threshold value.

4. The method according to claim 2, wherein said available correlation values are determined for a plurality of frequency compensations for each combination of a particular replica code and a particular code phase.

5. The method according to claim 2, wherein said selected correlation value is associated to a first frequency compensation, wherein a prediction interval for a respective correct code phase for other replica codes than said first replica code is determined only for correlation values resulting with said first frequency compensation.

6. The method according to claim 2, wherein said combining said selected correlation value with correlation values from said prediction intervals comprises one of
combining said selected correlation value with a respective highest correlation value from each prediction interval; and
combining said selected correlation value with all correlation values in all prediction intervals.

7. The method according to claim 2, further comprising in case a result of said combination does not exceed said predetermined threshold value, determining a next highest one of said correlation values at least in said subset of said available correlation values, wherein said selected correlation value is associated to a first replica code and a first code phase, and continuing with said determining.

8. The method according to claim 7, wherein determining a respective next highest one of said correlation values and continuing with said determining a respective prediction interval is limited to a predetermined number of iterations.

9. The method according to claim 2, further comprising determining said correlation values, wherein determining said correlation values comprises for each replica code a matched filter operation, a Discrete Fourier Transform operation, a coherent integration and a non-coherent integration.

10. The method according to claim 1, wherein said code modulated signal received at a receiver comprises signals transmitted by a plurality of satellites of at least one satellite based navigation system, and wherein each of said replica codes corresponds to a code employed by one of said satellites for encoding a signal for transmission.

11. The method according to claim 2, wherein said code modulated signal received at a receiver comprises signals transmitted by a plurality of satellites of at least two different satellite navigation system, wherein each replica code corresponds to a code employed by one of said satellites for encoding signals for transmission, and wherein a correlation value is selected only from a subset of correlation values which are available for replica code sequences associated to satellites of one of said satellite navigation systems.

12. An apparatus for supporting an acquisition of a code modulated signal received at a receiver, wherein said apparatus has access to at least a first set of correlation results for correlations between said code modulated signal and a first replica code with different code phases and a second set of correlation results for correlations between said code modulated signal and a second replica code with different code phases, said second replica code different from said first replica code, said apparatus comprising a processor and software code, the software code, with the processor configured to cause the apparatus to perform:
combine results from said first set of correlation results and from said second set of correlation results, wherein correlation results used in said combination are selected based on information on a relative difference between a correct code phase for said first replica code and a correct code phase for said second replica code; and
determine based on said combination whether at least one of said first set of correlation results and said second set of correlation results comprises a correlation result representing said correct code phase for said first replica code or said second replica code, respectively.

13. The apparatus according to claim 12, wherein the apparatus is one of
a mobile device;
a receiver for a satellite based navigation system;
a mobile terminal of a mobile communication system; and
a network element for a communication network.

14. The apparatus according to claim 12, further comprising a receiver configured to receive a code modulated signal and an acquisition module configured to determine at least a first set of correlation results for correlations between a received code modulated signal and a first available replica code with different code phases and a second set of correlation results for correlations between a code modulated signal and a second available replica code with different code phases.

15. A communication system comprising a network element of a communication network and a mobile device, which mobile device is configured to communicate with said network element, wherein at least one of said mobile device and said network element includes the apparatus according to claim 12.

16. The apparatus according to claim 12, wherein said correlation results are correlation values, and wherein correlation values of each of said sets of correlation results represent a respective correlation between samples of said received signal and one of a plurality of available replica codes with a plurality of code phases between said samples of said received signal and said available replica code, wherein for said combination, the software code with the processor is configured to cause the apparatus to:
a) select a highest one of said correlation values at least in a subset of said available correlation values, said selected correlation value being associated to a first replica code and a first code phase;
b) determine a respective prediction interval for a correct code phase for other replica codes than said first replica code based on said first code phase; and
c) combine said selected correlation value with correlation values from said prediction intervals;
and wherein for said determination, the software code with the processor is configured to cause the apparatus to accept said first code phase as a correct code phase for said first replica code, in case a result of said combination exceeds a predetermined threshold value.

17. The apparatus according to claim 16, wherein the software code with the processor is configured to cause the apparatus in a preceding step to determine whether any of said correlation values exceeds a further predetermined threshold value and to proceed with said selecting only in case none of said correlation values exceeds said further predetermined threshold value.

18. The apparatus according to claim 16, wherein the software code with the processor is configured to cause the apparatus to determine, in case a result of said combination does not exceed said predetermined threshold value, a next highest one of said correlation values at least in said subset of said available correlation values, wherein said selected correlation value is associated to a first replica code and a first code phase, and to continue with said determining.

19. The apparatus according to claim 16, wherein said code modulated signal received at a receiver comprises signals transmitted by a plurality of satellites of at least one satellite based navigation system, and wherein each of said replica codes corresponds to a code employed by one of said satellites for encoding a signal for transmission.

20. A memory having instructions encoded thereon for execution by a processing unit, for supporting an acquisition of a code modulated signal received at a receiver, wherein at least a first set of correlation results for correlations between said code modulated signal and a first replica code with different code phases and a second set of correlation results for correlations between said code modulated signal and a second replica code with different code phases are available, said second replica code different from said first replica code, said instructions realizing the following when running in said processing unit:
combining results from said first set of correlation results and from said second set of correlation results, wherein correlation results used in said combination are selected based on information on a relative difference between a correct code phase for said first replica code and a correct code phase for said second replica code; and
determining based on said combination whether at least one of said first set of correlation results and said second set of correlation results comprises a correlation result representing said correct code phase for said first replica code or said second replica code, respectively.

* * * * *